United States Patent [19]
Matsui

[11] Patent Number: 5,640,620
[45] Date of Patent: Jun. 17, 1997

[54] RADIATION REGULATING DEVICE FOR AN ELECTRONIC FLASH DEVICE AND METHOD FOR REGULATING SAME

[75] Inventor: Hideki Matsui, Fujisawa, Japan

[73] Assignee: Nikon Corporation, Tokyo, Japan

[21] Appl. No.: 276,401

[22] Filed: Jul. 18, 1994

[30] Foreign Application Priority Data

Jul. 22, 1993 [JP] Japan .................................. 5-201240
Jul. 23, 1993 [JP] Japan .................................. 5-202130

[51] Int. Cl.$^6$ ............................ G03B 15/03; H05B 37/00
[52] U.S. Cl. ...................... 396/156; 396/155; 315/241 P
[58] Field of Search ............................ 354/135, 145.1, 354/149.11, 416, 418; 315/241 P; 396/155, 156, 206

[56] References Cited

U.S. PATENT DOCUMENTS

| | | |
|---|---|---|
| 4,839,686 | 6/1989 | Hosomizu et al. .................. 354/416 |
| 4,951,081 | 8/1990 | Hosomizu et al. .................. 354/416 |
| 5,075,714 | 12/1991 | Hagiuda et al. .................... 354/416 |
| 5,111,233 | 5/1992 | Yokonuma et al. ................. 354/416 |
| 5,159,381 | 10/1992 | Harrison ............................. 354/416 |
| 5,250,977 | 10/1993 | Tanaka ............................... 351/413 |
| 5,313,247 | 5/1994 | Hosomizu et al. .................. 354/415 |

*Primary Examiner*—Safet Metjahic
*Assistant Examiner*—Nicholas J. Tuccillo
*Attorney, Agent, or Firm*—Oliff & Berridge

[57] ABSTRACT

With an electronic flash device that utilizes an IGBT, circuit construction can be simplified using a single condenser as both the trigger condenser of a trigger circuit and the voltage doubling condenser. In addition, because the recharging of the multi-purpose condenser is accomplished through the radiation current that flows through the light emitting tube directly after the collector/emitter gap of the IGBT becomes nonconductive, the device allows flash radiations to be repeated at high speed.

17 Claims, 3 Drawing Sheets

RADIATION REGULATING DEVICE FOR AN ELECTRONIC FLASH DEVICE AND METHOD FOR REGULATING SAME

BACKGROUND OF THE INVENTION

1. Field of the Invention

The present invention relates to a method and apparatus for a radiation regulating circuit used in electronic flash devices that use a voltage regulating-style switching element for regulating the radiation of a light emitting tube.

2. Description of Related Art

FIG. 3 is a circuit diagram that shows the construction of a conventional radiation regulating circuit for an electronic flash device. In this diagram, when a power supply switch 100 is closed, a power supply voltage increasing circuit 101 commences operation. Radiation energy is recharged in a main condenser 102, which is connected between a power supply line L1 and a ground line L2 of the power supply voltage increasing circuit 101, and which is also charged in the trigger condenser 104. Also, a zener voltage is generated in the zener diode 110 through a resistor 109. The zener voltage is added to a gate of an insulated gate bipolar transistor (referred to hereafter as "IGBT"), and the collector/emitter gap of the IGBT 108 becomes conductive.

When a radiation commencement signal is input to the trigger terminal TG under these conditions, the anode/cathode gap of the thyristor 105 becomes conductive, a closed loop is formed with the trigger condenser 104 and the primary side of the trigger coil 106, and the charge in the trigger condenser is discharged. In this manner, the trigger voltage is added to the light emitting tube 107 and the light emitting tube commences radiation.

Next, when a radiation termination signal is input to terminal STP while the light emitting tube 107 is radiating, the gate of the IGBT 108 is grounded to the ground line L2 through conduction between the collector/emitter gap of the transistor 111. The collector/emitter gap of the IGBT 108 becomes nonconductive, and the radiation of the light emitting tube 107 ceases.

However, a radiation regulating circuit for an electronic flash device constructed in this manner has no voltage impression doubling circuit for approximately doubling the charging voltage of the main condenser 102 on both ends of the light emitting tube 107. Also, the charging of the trigger condenser 104 is carried out through the resistor 103, but because the resistance value of the resistor 103 is controlled by the thyristor 105, a rapid charge cannot be accomplished because a comparatively large resistance on the order of several hundred kilo-ohms is used. Therefore, high speed repetition of radiation of the light emitting tube has not been possible.

SUMMARY OF THE INVENTION

The present invention is constructed so as to resolve the problems described above, and its objective is to provide a radiation regulating circuit for an electronic flash device that can repeatedly flash the light emitting tube at high speeds.

According to a first aspect of the invention, there is provided a radiation circuit for an electronic flash device comprising a light emitting tube arranged between a power supply line and a ground line, a primary condenser that is connected between the power supply line and the ground line that is charged by the power supply line and accumulates a charge that causes the light emitting tube to radiate, a series-connected body comprising a one-directional element and a switching element connected between one end of the light emitting tube and the ground line, a voltage impression doubling circuit that is connected in parallel to the series-connected body, and which supplies the light emitting tube with a voltage approximately equal to a recharging voltage of the primary condenser after a regulating voltage has been added to a regulating terminal of the switching element and after a first set time interval, and a trigger circuit, which has a delay circuit that sends a trigger voltage to the light emitting tube after one end of the light emitting tube has reached a predetermined electric potential and after a second set time interval.

In another aspect of the present invention, there is provided a radiation regulating circuit for an electronic flash device, comprising a light emitting tube arranged between a power supply line and a ground line, a primary condenser connected between the power supply line and the ground line that is charged by the power supply line and which accumulates a charge that causes the light emitting tube to radiate, a series-connected body comprising a one-directional element and a switching element connected between one end of the light emitting tube and the ground line, a voltage impression doubling circuit that is formed from a series connection between an inductor connected in parallel to the series-connected body and a secondary condenser, and which adds a doubling voltage to the light emitting tube, in addition to charging a charge in the secondary condenser when the switching element is turned off, and a trigger circuit, which adds a trigger voltage to the light emitting tube based on the charge charged in the secondary condenser.

In yet another aspect of the present invention, there is provided a radiation regulating circuit for an electronic flash device, comprising a light emitting tube arranged between a power supply line and a ground line, a primary condenser that is connected between the power supply line and the ground line that is charged by the power supply line and which accumulates a charge that causes the light emitting tube to radiate, a series-connected body comprising a one-directional element and a switching element connected between one end of the light emitting tube and the ground line, voltage impression doubling means for: 1) adding a doubling voltage to the light emitting tube and for charging a charge in the secondary condenser when the switching element is turned off; or 2) providing the light emitting tube with a voltage that is approximately equal to a recharging voltage of the primary condenser after a regulating voltage has been added to a regulating terminal of the switching element and after a first set time interval and trigger circuit means for: 1) adding a trigger voltage to the light emitting tube based on the charge charged in the secondary condenser; or 2) adding a voltage to the light emitting tube after one end of the light emitting tube has reached a predetermined electric potential and after a second set time interval.

In still another aspect of the present invention, there is provided a method for regulating the radiation in an electronic flash device that includes a light emitting tube arranged between a power supply line a ground line, a primary condenser that is charged by the power supply line and which accumulates a charge that causes the light emitting tube to radiate, a series-connected body comprising a switching element located between one end of the light emitting tube and the ground line, and a voltage doubling circuit having a secondary condenser connected in parallel to the series-connected body. The method comprises the steps of charging the primary condenser and the secondary condenser to a predetermined level that is below a threshold value required to activate the switching element, supplying the switching element with an additional voltage that is above said threshold value to activate the switching element, radiating the light emitting tube by supplying the light emitting tube with charges stored in said primary and secondary condenser; recharging the secondary condenser during the radiating step.

When the gate voltage adding circuit that adds the gate voltage to an IGBT is started by the radiation commencement signal, the collector/emitter gap of the IGBT becomes conductive. When the voltage doubling circuit begins to operate, a voltage that is approximately twice that of the charging voltage of the main condenser is added to both ends of the light emitting tube by the voltage impression doubling circuit after the primary set time interval. A negative voltage corresponding to the charging voltage of the main condenser is added to the voltage from the voltage generating and adding circuits and when this negative charge is generated, the trigger circuit starts automatically. However, there is no requirement for a trigger condenser in the trigger circuit because the condenser of the voltage doubling circuit also serves as a condenser for the trigger circuit. After the second set time interval has elapsed, the trigger voltage is added to the light emitting tube and radiation commences.

Also, because the recharging of the condenser of the voltage doubling circuit is accomplished at high speed through the flow of light emitting current through the light emitting tube after the collector/emitter gap of the IGBT becomes nonconductive, it can correspond to light emissions repeated at high speed.

With the present invention, voltage is added to the gate of the IGBT through a radiation commencement signal alone, a voltage of approximately twice that of the charging voltage of the main condenser is added to both ends of the light emitting tube, and a trigger voltage is added to the light emitting tube. Because the sequence is thus arranged, it is easier for the light emitting tube to radiate. Also, because the voltage impression doubling condenser is charged through the light emitting current, it is possible to correspond to light emissions repeated at high speed.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

An embodiment of the present invention described hereafter, with reference to the drawings.

Figure 1:
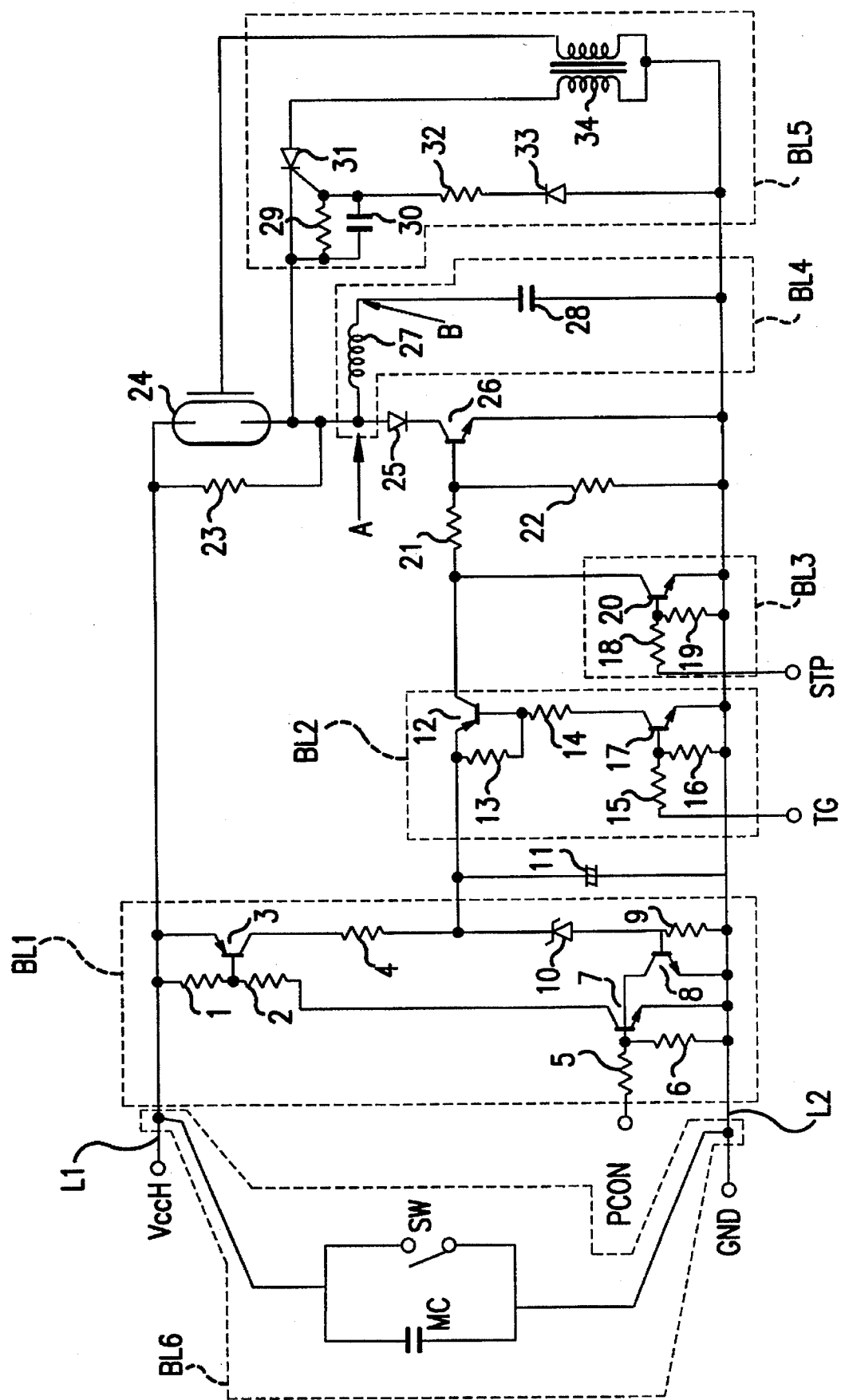
FIG. 1 is a circuit diagram that shows the construction of an embodiment of a radiation regulating circuit for an electronic flash device that relates to the present invention.

FIG. 1 is a circuit diagram that describes the construction of an embodiment of a radiation regulating circuit for an electronic flash device, according to the present invention. In FIG. 1, bias resistors 21–23 cooperate with a condenser 11 and a light emitting tube 24. The light emitting tube 24 has one end connected to the power supply line L1, a diode 25 has an anode attached to the other end of the light emitting tube 24, and an IGBT 26 has a collector attached to the cathode of the diode 25 and an emitter attached to the ground line L2. A voltage increasing circuit BL6 with an attached switch SW and a main condenser MC (hereafter also referred to as a primary condenser) that accumulates the charge that is charged by the power supply voltage and which causes the light emitting tube 24 to radiate (not shown in the drawing) are connected in parallel between the power supply line L1 and the ground line L2.

A gate voltage generating circuit BL1 comprises resistors 1, 2, 4, 5, 6, and 9 and a zener diode 10. The gate voltage generating circuit BL1 generates the gate voltage of the IGBT, using the charging voltage of the main condenser (not shown), and charges the charging voltage in the condenser 11. A gate voltage adding circuit BL2 comprises resistors 13, 14, 15, and 16 and transistors 12 and 17. This gate voltage adding circuit BL2 has a trigger terminal TG, and adds the charge charged in the condenser 11 to the gate of the IGBT 26 when a radiation commencement signal is input to the trigger terminal TG.

A gate voltage eliminating circuit BL3 comprises resistors 18 and 19 and transistor 20. The gate voltage eliminating circuit BL3 has a terminal STP that eliminates the gate voltage of the IGBT 26 when the voltage termination signal is input.

A voltage impression doubling circuit BL4 comprises an inductor 27 and a voltage impression doubling condenser 28 (hereafter also referred to as a secondary condenser) that are connected in series. Through the closed loop formed by the diode 25 and the collector/emitter gap of the IGBT 26, a negative voltage that is opposite to the voltage charged in the main condenser (not shown) is added to connection point A of the voltage doubling circuit BL4. As a result, a voltage approximately twice that of the charging voltage of the main condenser is added to both ends of the light emitting tube 24.

A trigger circuit BL5 comprises resistor 29, condenser 30, thyristor 31, resistor 32, diode 33, and trigger transformer 34. A delay circuit is formed within the trigger circuit BL5 through condenser 30 and resistor 32. When connection point A receives a negative voltage through the operation of the voltage impression doubling circuit BL4, the anode/cathode gap of the thyristor in the trigger circuit BL5 becomes conductive and a trigger voltage is supplied to the light emitting tube. A trigger condenser such as is used in a conventional circuit is not used in the trigger circuit BL5.

With this type of construction, when the power supply switch (not shown) is turned on, a strobe switch is turned on, terminal PCON (power control) goes to level "H," and the signal is input to the base of the transistor 7 through resistor 5. In this manner, the collector/emitter gap of transistor 7 becomes conductive, and the collector/emitter gap of transistor 3 also becomes conductive. A condenser 11 is then charged by the main condenser MC up to the voltage of the zener diode 10. When the power supply switch is closed, the voltage increasing circuit (not shown) commences operation, and the main or primary condenser (not shown) is also charged in the same manner. Furthermore, condenser 28 is charged to the same voltage as the main condenser through resistor 23 and inductor 27.

The operation of each component of the radiation regulating circuit thus constructed is next described, using the timing chart shown in FIGS. 2(a)–2(e).

Figure 2:
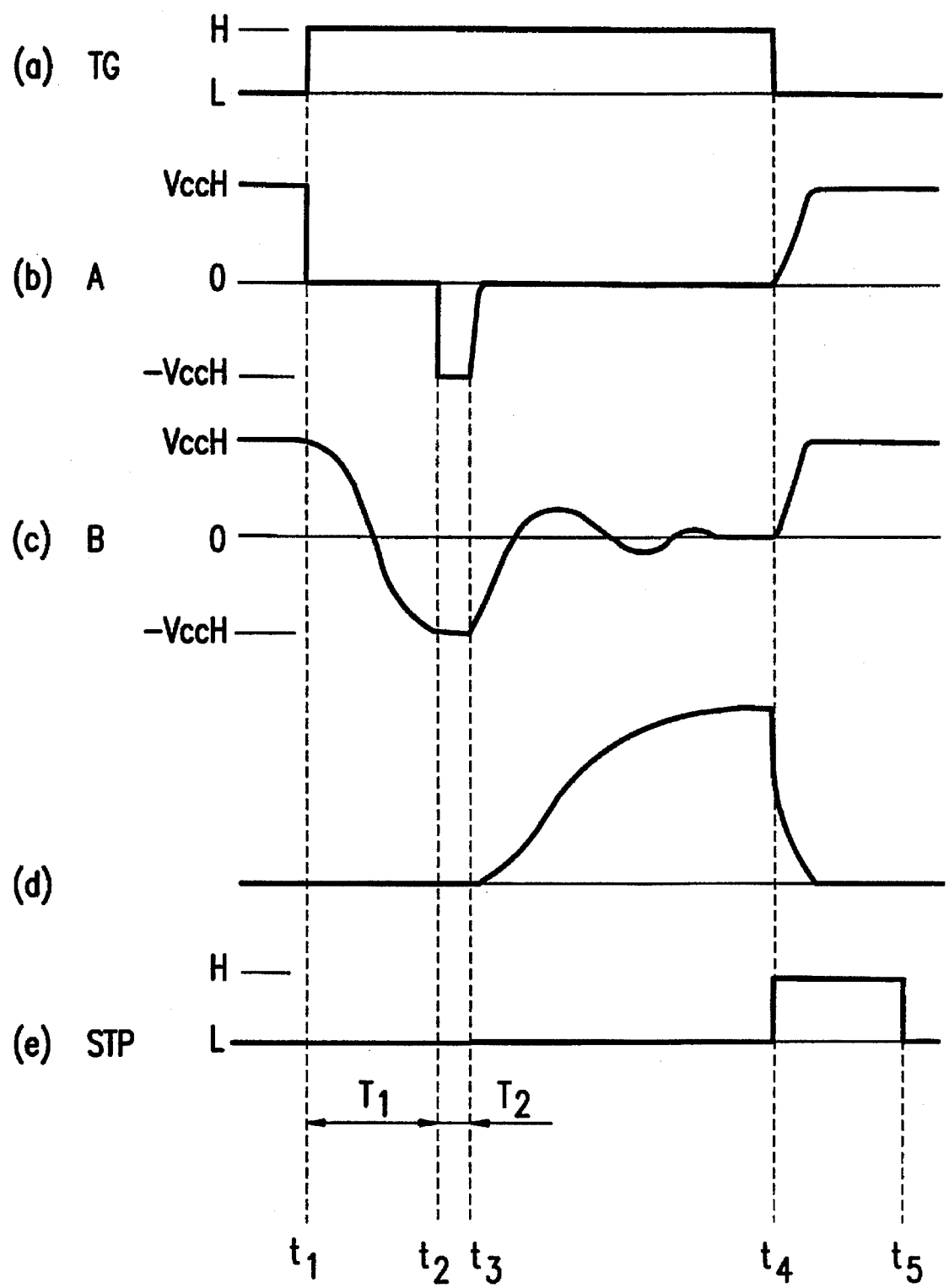
FIGS. 2(a)–2(e) are drawings that show timing charts that describe the operation of each component of the circuit diagram of FIG. 1.
Figure 3:
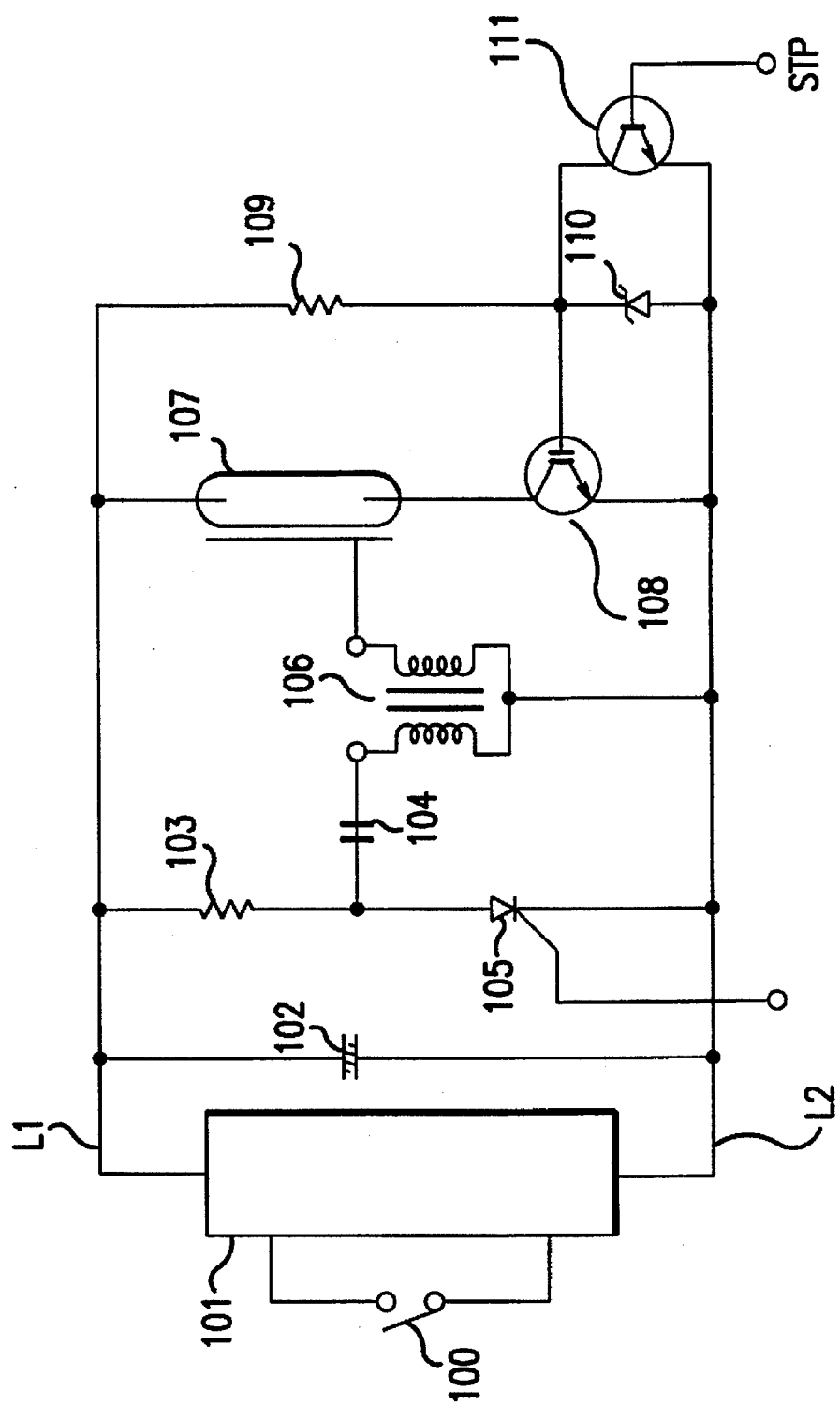
FIG. 3 is a circuit diagram that shows the construction of an embodiment of a conventional radiation regulating circuit for an electronic flash device.

When connecting point X (attached to the camera side, but not shown in the drawing) is closed, a radiation commencement signal is output to trigger terminal TG at the time t1 as shown in FIG. 2(a). Through this signal, the charging voltage charged in condenser 11 is added to the IGBT 26 gate by the gate voltage adding circuit BL2. Through the addition of this gate voltage, the collector/emitter gap of the IGBT 26 becomes conductive (time t1 of FIG. 2(b)).

Also, through the conductivity of the IGBT 26 collector/emitter gap, a closed loop is formed by the voltage impression doubling circuit BL4, diode 25, and IGBT 26. The voltage of connecting point B changes between times t1 and t2 (the first set time interval T1) as shown in FIG. 2(c), through the LC resonance formed between the inductor 27 and the condenser 28. Also, the voltage of connecting point A is discontinuously changed to a negative voltage at time t2. Through the changing of connecting point A to a negative voltage, the trigger circuit BL5 is activated. At this point, a trigger voltage is not immediately added to the light emitting tube 24. Instead, it is added after a charging time (the second set time interval T2) that extends from time which is determined by the delay circuit formed by condenser 30 and resistor 32, to time t3.

The light emitting tube 24 begins to radiate through the addition of the trigger voltage, as shown in FIG. 2(d). Through the radiation of the light emitting tube 24, a light measuring circuit (not shown) begins a light amount integration procedure, and inputs a radiation termination signal to terminal STP when the object being photographed has received the proper amount of light, at the time t4 as shown in FIG. 2(e). Simultaneously, the radiation commencement signal being input to terminal TG is terminated. Also, through the input of the radiation stopping signal to terminal STP, the gate voltage eliminating circuit BL3 commences operation, and the gate voltage of the IGBT 26 is eliminated. In this manner, the collector/emitter gap of the IGBT 26 becomes nonconductive, and the light emitting tube 24 ceases to radiate, as shown in FIG. 2(d).

Through the set of operations described above, one cycle of radiation is completed, but because the condenser 28 of the voltage impression doubling circuit BL4 is recharged immediately after the collector/emitter gap of the IGBT 26 has become nonconductive by the current that flows through the light emitting tube 24, the next cycle of radiation can be performed immediately. Also, because the condenser 28 doubles as the trigger condenser, it becomes possible for the trigger voltage to be added to the light emitting tube 24 each time, even at times of high-speed radiation.

By using the present invention, described above, the light emitting tube will not fail to radiate because the sequence that relates to the radiation of the light emitting tube is regulated so as to operate the trigger circuit after a doubling voltage has been added to the light emitting tube by a unique radiation commencement signal. Also, because one set of operations is performed by the radiation commencement signal alone, the regulating system can be simplified. Furthermore, because the second condenser 28 of the voltage doubling circuit also serves as the trigger condenser, and because condenser 28 uses the radiation current that flows through the light emitting tube to recharge, an extremely superior result can be obtained that corresponds even to radiation repeated at high speed.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A radiation regulating circuit for an electronic flash device, comprising:

a light emitting tube arranged between a power supply line and a ground line, a primary condenser connected between the power supply line and the ground line that is charged by the power supply line, and which accumulates a charge that causes the light emitting tube to radiate, a series-connected body comprising a one-directional element and a switching element connected between one end of the light emitting tube and the ground line, a voltage impression doubling circuit formed from a series connection between a first inductor and a secondary condenser, the voltage impression doubling circuit connected at a connecting point in parallel to the series-connected body, which adds a doubling voltage to the light emitting tube in addition to charging a charge in the secondary condenser when the switching element is turned off, and a trigger circuit, separate from the voltage impression doubling circuit, the trigger circuit including a transformer having a second inductor that triggers the light emitting tube depending on a voltage at the connecting point by adding a trigger voltage to the light emitting tube based on the charge charged in the secondary condenser.

2. The radiation regulating circuit according to claim 1, wherein the switching element is an insulated gate bipolar transistor.

3. A radiation regulating circuit for an electronic flash device, comprising:

a light emitting tube arranged between a power supply line and a ground line, a primary condenser connected between the power supply line and the ground line, the primary condenser being charged by the power supply line and accumulates a charge that causes the light emitting tube to radiate, a series-connected body comprising a one-directional element and a switching element connected between one end of the light emitting tube and the ground line, a voltage impression doubling circuit including a first inductor connected in parallel at a connecting point to the series-connected body, and which supplies the light emitting tube with a voltage approximately equal to a recharging voltage of the primary condenser after a regulating voltage has been added to a regulating terminal of the switching element and after a first set time interval, the voltage impression doubling circuit charging a charge in a secondary condenser when the switching element is turned off, and a trigger circuit, separate from the voltage impression doubling circuit, the trigger circuit including a transformer having a second inductor, which has a delay circuit that sends a trigger voltage to the light emitting tube after one end of the light emitting tube at the connecting point has reached a predetermined set electric potential and after a second set time interval.

4. The radiation regulating circuit according to claim 3, wherein the first set time interval is determined by the delay time in the voltage impression doubling circuit.

5. The radiation regulating circuit according to claim 3, wherein the second set time interval is determined by the delay circuit of the trigger circuit.

6. The radiation regulating circuit according to claim 3, wherein the switching element comprises an insulated gate-style bipolar transistor.

7. A radiation circuit for an electronic flash device, comprising:

a light emitting tube arranged between a power supply line and a ground line;

a primary condenser connected between the power line and the ground line, the primary condenser being charged by the power supply line and accumulating a charge that causes the light emitting tube to radiate;

a series-connected body comprising a one-directional element and a switching element connected between one end of the light emitting tube and the ground line;

voltage doubling means including a first inductor means for providing the light emitting tube with a voltage that is approximately twice a recharging voltage of the primary condenser after a first set time interval and after a regulating voltage has been added to a regulating terminal of the switching element, the voltage doubling means charging a charge in a secondary condenser when the switching element is turned off, the voltage doubling means connected in parallel with the series-connected body at a connecting point; and trigger circuit means, separate from the voltage impression doubling means, the trigger circuit means including a second inductor means for sending a trigger voltage to the light emitting tube after one end of the light emitting tube has reached a predetermined electric potential at the connecting point and after a second time interval.

8. A radiation regulating circuit according to claim 7, wherein the first set time interval is determined by a delay time in the voltage impression doubling means.

9. The radiation regulating circuit according to claim 7, wherein the second time interval is determined by a delay circuit included in the trigger circuit means.

10. The radiation regulating circuit according to claim 7, wherein the switching element comprises an insulated gate-style bipolar transistor.

11. The radiation regulating circuit according to claim 7, wherein the switching element is an insulated gate bipolar transistor.

12. A method for regulating the radiation in an electronic flash device that includes a light emitting tube arranged between a power supply line and a ground line, a primary condenser that is charged by the power supply line and which accumulates a charge that causes the light emitting tube to radiate, a series-connected body comprising a switching element located between one end of the light emitting tube and the ground line, a voltage doubling circuit having a secondary condenser and a first inductor connected in parallel to the series-connected body at a connecting point, and a trigger circuit separate from the voltage doubling circuit, the trigger circuit including a second inductor;

the method comprising the steps of:

charging the primary condenser and the secondary condenser to a predetermined level that is below a threshold value required to activate the switching element;

supplying the switching element with an additional voltage that is above said threshold value to activate the switching element;

triggering the light emitting tube using the trigger circuit based on the voltage at the connecting point;

radiating the light emitting tube by supplying the light emitting tube with charges stored in said primary and secondary condensers; and recharging the secondary condenser during said radiating step.

13. The method according to claim 12, further comprising the steps of measuring the amount of radiating light applied to an object, and deactivating the switching element after the measured value of the radiating light applied to the object is judged proper.

14. The method according to claim 12, wherein the voltage doubling circuit adds a voltage that doubles the voltage in the light emitting tube and charges a charge in the secondary condenser when the switching element is deactivated.

15. The method according to claim 12, wherein the secondary condenser provides the light emitting tube with a voltage that is approximately equal the amount of voltage supplied by the primary condenser to effectively double the voltage supplied to the light emitting tube after a regulating voltage has been added to a regulating terminal of the switching element.

16. The method according to claim 12, wherein the voltage doubling voltage circuit activates the trigger voltage circuit after a first set time interval.

17. The method according to claim 16, wherein the the trigger voltage circuit includes a delay circuit and the method includes applying the trigger voltage to the light emitting tube after a second time interval.

* * * * *